Oct. 25, 1949. F. A. KANE, JR Re. 23,157

TUBE COUPLING

Original Filed June 26, 1946 2 Sheets-Sheet 1

INVENTOR.
FRANK A. KANE, JR.
BY
E. H. Armack
ATTORNEY.

Oct. 25, 1949. F. A. KANE, JR Re. 23,157

TUBE COUPLING

Original Filed June 26, 1946 2 Sheets-Sheet 2

INVENTOR.
FRANK A. KANE, JR.
BY E. R. Bruack
ATTORNEY

Reissued Oct. 25, 1949

Re. 23,157

UNITED STATES PATENT OFFICE 23,157

TUBE COUPLING

Frank A. Kane, Jr., Fairfield, Conn.

Original No. 2,466,317, dated April 5, 1949, Serial No. 679,316, June 26, 1946. Application for reissue August 25, 1949, Serial No. 112,332

7 Claims. (Cl. 285—122)

This invention relates to tube fittings, particularly to couplings for tubing of comparatively ductile or malleable material such as copper, aluminum, or other deformable metal.

The invention is primarily adapted for use with that class of fittings of the above-mentioned category wherein a flared end of the tube is clamped between a pipe connection (such as a threaded adapter) and a coacting nut member, so that the tube and pipe connection will together form a rigid and axially aligned unit. The invention is particularly adapted for use with the conventional arrangement above described containing a sleeve or ring disposed around the flared tube terminal and maintained thereagainst by the nut member.

In many joint structures of the conventional type above referred to, there is insufficient grip between the component parts, so that it is a common occurrence for the fitting to become loosened at the joint under stress, such as would result from a bending of the tube in the region of the fitting. Such a loosening effect not only causes an undesirable structural weakness, but also renders the joint subject to leakage. Due to the dangerous consequences of such leakage, especially where explosive gases are to be conveyed, official approval by underwriters or similar institutions has been very frequently withheld in the case of many fittings of the above-mentioned conventional type.

It is accordingly primarily within the contemplation of this invention to eliminate the shortcomings prevalent in many commercial coupling fittings by providing a joint structurally reinforced at its weakest point, with sufficient grip between the engaged members to prevent a displacement of any of such members when the device is subjected to severe working stresses, and consequently to obviate the danger of gas or liquid leakage.

In the production of a reinforced and leakproof joint, it is a further object of my invention to avoid the danger of grinding down or thinning the wall of the tubing or otherwise mutilating the tubing. And in this aspect of my invention, it is a further object to keep the nut member out of engagement with the soft tube material, so that the operative turning of the nut will cause no damage to the tubing.

It is another object of this invention to enable the nut member, upon an operative rotation thereof when in threaded engagement with the pipe connection, to effect a swedging action to the flared tube end while the tube is being attached to the said pipe connection. And it is within the contemplation of my invention to produce, during this swedging action, an even and controlled outward spreading of the flared end of the tube at all points circumferentially, whereby the flared end is of uniform thickness throughout its entire periphery, thereby helping to maintain the sleeve and tubing in axial alignment with the pipe connection.

It is a further object of my invention to provide positive means for forcing the sleeve into operative engagement with the flared end of the tube and the pipe connection, thereby producing an effective swedging action. And it is within the contemplation of this invention to supplement said positive action with a two-point engaging arrangement, that is, with an arrangement during the swedging action whereby the sleeve is engaged at the rear and at the front regions thereof, thereby further aiding an axial alignment between the sleeve and tubing and the pipe connection.

In the accomplishment of certain of the objectives of this invention, it has been within my contemplation to provide a pipe fitting having an annular recess with an inner inclined wall, a tubing with a flared end, a sleeve with inner and outer inclined wall, wherein the mutually engaging surfaces will, during the swedging action above referred to, cause certain deformations in the tubing and the thin forward and rear ends of the sleeve, to produce a close frictional engagement between the contacting members, and a lock-nut action that will hold the members against displacement due to vibration or mechanical stresses, all as will more fully hereinafter appear. And it has also been within my contemplation to make the said annular recess, flared tube end and forward sleeve terminal of such relative proportions that the sleeve and flared end will readily enter the annular recess, and yet under the said swedging action will be in pressing engagement, to enhance the sealing effect.

It is a further object of this invention to enable a given fitting to be adaptable for use with tubing of various wall thicknesses.

And a further object of my invention is to provide a simple and easily fabricated device capable of attaining the objectives aforesaid.

Other objects, features and advantages will appear from the drawings and the description hereinafter given.

Referring to the drawings.

Figure 1:
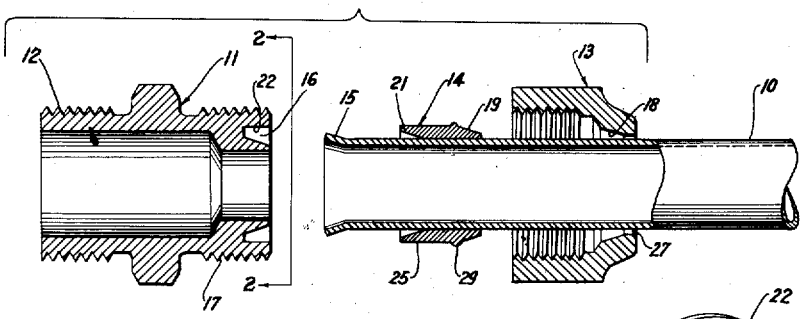
Figure 1 is a part sectional, part elevational view of the component members of my invention, shown in partially assembled relation.
Figure 2:
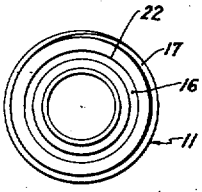
Figure 2 is of the adapter looking in the direction 2—2, as viewed in Figure 1.
Figure 3:
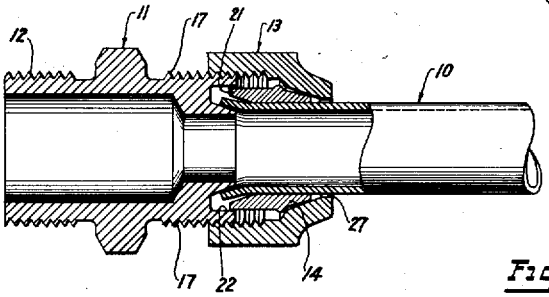
Figure 3 is a view like Figure 1, showing the component members in assembled relation just prior to their final position.

In the embodiment of my invention shown in the drawings, the tube 10, which may be copper, aluminum or other deformable metal, is to be joined to the pipe connection or adapter 11 over the forward threaded portion 12 of which a pipe (not shown) is to be secured. Although the adapter is shown with an outer thread 12 for receiving the pipe, it may, within the scope of this invention, be of the female type having an internally threaded wall for receiving the pipe or other suitable fitting.

In the preferred method of practicing my invention, a locking member or nut 13 and a sleeve 14 forwardly thereof are placed upon the tube 10, as shown in Figure 1. The forward portion of sleeve 14 is internally recessed by a conical surface 24 which forms a tapered wall portion 21. Then, by any suitable means, the forward end 15 of the tube is flared outwardly a predetermined amount, whereby it will be adapted to enter an annular recess 16 provided in the end wall of adapter 11. Thereafter the said flared end 15 of the tube and the tapered forward portion 21 of sleeve 14 are inserted in the recess 16, after which the nut 13 is moved forwardly along the tube and into threaded engagement with rear portion 17 of the adapter. Upon an operative rotation of the nut 13, an inner conical wall 18 provided in the rear portion of the locking member or nut 13 will engage an outer conical surface 19 provided in the rear portion of the sleeve to form a tapered wall portion 20, press said rear tapered wall portion 20 slightly into the relatively soft metal of the contiguous tube, and urge the tube and sleeve assembly into the said annular recess 16 of the adapter 11, all in a manner to be more fully hereinafter set forth. The operation is such that upon a turning of the nut 13, the tube and sleeve are caused to move longitudinally, to draw the forward tapered end 21 of the sleeve and the flared end 15 of the tube into annular recess 16, and into pressing engagement with each other and with the outer cylindrical surface 22, and the inner conical surface 23 of said annular recess.

In the preferred relationship of the coacting members of my invention, the inclination of the outer tapered surface 19 of the rear portion of the sleeve, relative to the longitudinal (or horizontal as viewed in the drawing) axis of the tube, is less than the inclination of the rear inner conical wall 18 of the nut. Satisfactory results are obtained when these inclinations are 12° and 13°, respectively. In the mentioned preferred relationship, the inclination of the forward inner conical surface 24 of the sleeve, relative to the horizontal, is less than the inner conical surface 23 of annular recess 16 of connector 11. Satisfactory results are obtained when these inclinations are 19½° and 20°, respectively. In the mentioned preferred relationship, the inclination of the flared portion 15 of the tube, relative to the horizontal, is less than the inclinations of both the forward inner conical surface 24 of the sleeve and the inner conical surface 23 of the annular recess. In the preferred relationship, the inclination of flared end 15 is 14°–15°. It is also preferred that the diameter of the outer cylindrical surface 25 of the sleeve be slightly less than that of the outer cylindrical surface 22 of the annular recess, so that there is a clearance space 26 between the sleeve and outer recess wall before the final swedging operation. I have found that a clearance of from .0015" to .003" produces satisfactory results. It is, however, understood, that angles, proportions and relationship of parts other than those hereinabove specified may be used, within the scope and intent of my invention.

For best operative results, and to attain one of the important objections of my invention, the rear aperture 27 of the nut or locking member 13 is of greater diameter than that of the tube 10, so that the interior surface 28 of the nut will at all times be removed from the tube. The arrangement is hence such that the nut is in engagement only with the adapter and the sleeve, and always out of engagement with the tube, so that the nut will never, during the operative rotation thereof, grind, cut into or otherwise mutilate the relatively soft tubing.

An important feature of my invention is the positive means for effectuating a swedging action upon the portions of the tube and sleeve inserted within the annular recess 16. This is accomplished by means of the circumferential protuberance or ridge 29 on the outer surface of the sleeve 14, preferably at the juncture of the cylindrical surface 25 and the tapered surface 18. During the forward movement of the nut when it is operatively rotated, the corner portion 30 of the conical wall 31 engages the said ridge 29, and urges it forwardly, so that both the sleeve and the tube (in the manner aforesaid) are moved forwardly towards the adapter. This positive arrangement is much more direct and effective than those conventional methods employing the indirect action of frictional means.

Figure 4:
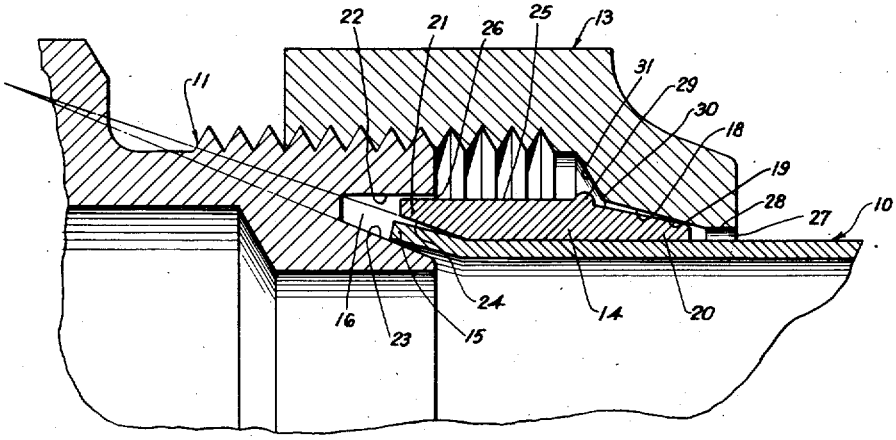
Figure 4 is an enlarged fragmentary section showing the relative position of the members according to Figure 3.
Figure 5:
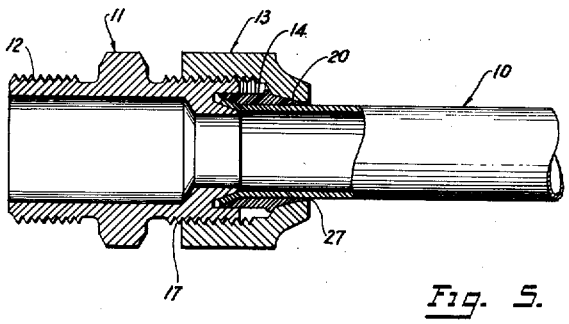
Figure 5 is a view like Figure 3, but showing the component members in their final assembled position.
Figure 6:
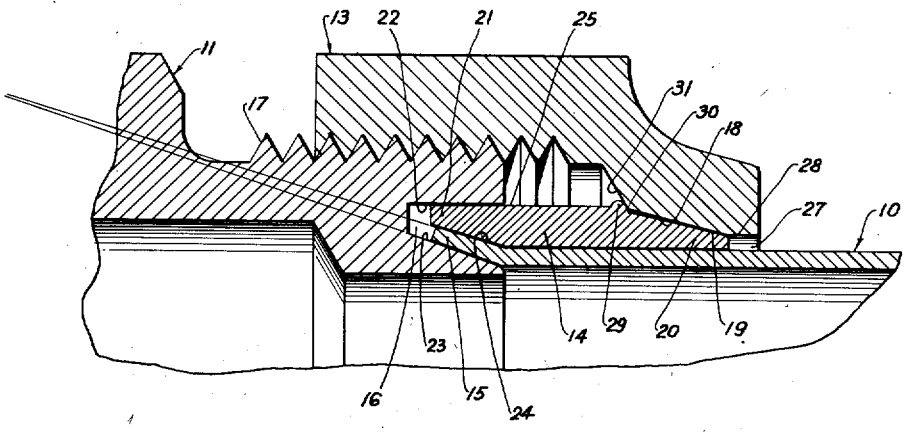
Figure 6 is an enlarged fragmentary section showing the relative position of the members, according to Figure 5.
Figure 7:
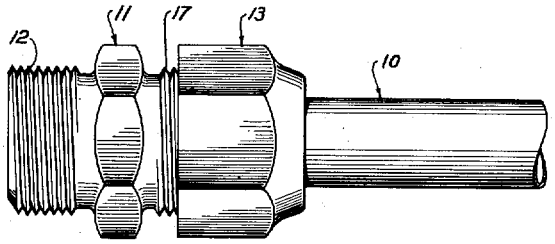
Figure 7 is an elevational view of the assembly of Figure 5.

The functioning of the tapered wall portion 21 at the forward end of sleeve 14 is as follows: Tapered sleeve portion 21 and the flared end 15 of the tube conjointly enter the annular recess 16, the cylindrical outer surface 22 of the recess being somewhat larger in diameter than the outer cylindrical surface 25 of sleeve 14 to permit conjoint entry into the annular recess, as shown in Figure 4. As the sleeve and tube 10 are moved longitudinally forwardly toward connector 11 (by the nut 13, as already described), the tapered sleeve portion 21 and flared end 15 of the tube are conjointly forced further into annular recess 16, as shown in Figure 6. By reason of its tapered construction the portion 21 is forced outwardly, bending in the region of its proximal end where it joins the thick wall of the sleeve proper. This outward bending of forward tapered portion 21 continues until its outer surface 25 forms a tight press fit with outer cylindrical surface 22 of the annular recess, as shown in Figure 6. This outward bending of tapered portion 21 is caused, in the forward movement of the sleeve and tube, by the inner conical surface 23 of the annular recess, the outward bending pressure being transmitted through the flared end 15 of the tube interposed between conical surface 23 and tapered portion 21, as shown in Figure 6. The reason for giving the forward inner conical surface 24 of the sleeve an inclination relative to the horizontal less than the inclination of the inner conical surface 23 of the annular recess is as follows: As the tapered sleeve portion 21 and flared end 15 conjointly advance into annular recess 16, the aforesaid outward bending pressure (transmitted through the interposed flared end 15) is at first applied at the distal or forward end of the tapered portion 21 due to the smaller angle of its inner conical surface 24. As advancement of 21 and 15 and the outward bending of 21 continue, the point, or rather area, of application of the outward bending pressure progresses towards the proximal end of 21 until in the final position shown in Figure 6 the pressure is applied throughout the abutting surfaces 24 and 23.

The reason the inclination of flared end 15 of the tube is less than the inclinations of the inner conical surface 24 and the inner conical surface 23 of the annular recess is as follows: The hold imposed on the tube against axial pulling away or loosening by bending stress on the tube and the tightness of the seal in the annular recess of the connector will be improved by increasing the inclination of the flared end of the tube. The arrangement described permits the flared end of the tube to be given an inclination greater than usually present in such devices heretofore made, and also assures that the tube end is flared uniformly at all points of its periphery. Moreover, the tube end is flared in two steps or stages, viz., an initial flaring (inclination of 14°–15°) after the sleeve and nut are placed on the tube, see Figure 1 and Figure 4, and a final flaring (inclination of 20°) at the time the flared end of the tube and the forward tapered portion of the sleeve are forced tight into the annular recess, see Figure 6. The two-stage flaring of the tube is of special importance in view of the large angle of inclination to which the tube end is flared; the tube might be too severely strained were it attempted to flare its end to this extent in one operation. With sufficiently small angles, or tubes of relatively thin or malleable walls, the induced strain would obviously be less, and the use of preflated tubing would be entirely unnecessary.

The functioning of the tapered wall portion 20 at the rear end of sleeve 14 is as follows: As the inner conical wall 18 of nut 13 engages the outer conical surface 19 at the rear of the sleeve and the nut is advanced forwardly, to the left in Figure 4, a downward or innerward pressure is imposed by conical wall 18 of the nut upon the rear tapered wall portion 20 of the sleeve. By reason of its tapered construction the portion 20 is forced inwardly, bending in the region of its proximal end where it joins the thick wall of the sleeve proper. This inward bending of tapered portion 20 causes the rear portion of the sleeve to effect a tight press fit with the tube, by reason of which fit both the sleeve and the tube are moved conjointly forwardly (to force the forward tapered portion 21 and the flared end 15 of the tube into the annular recess 16, as already described). The reason for giving the rear outer conical surface 19 of the sleeve an inclination relative to the horizontal less than the inclination of the inner conical wall 18 of the nut is as follows: As the nut is threaded forwardly, Figure 4, the aforesaid inward bending pressure is at first applied at the distal or rear end of tapered wall portion 20, as shown in Figure 4, due to the smaller angle of inclination of its conical surface 19. As advancement of the nut and inward bending of 20 continue, the point, or rather area, of application of the inward bending pressure progresses toward the proximal end of 20 until in the final position shown in Figure 6 the pressure is applied throughout the abutting surfaces 18 and 19.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

I claim:

1. In a coupling device for tubing having an outwardly flared end portion, a connector member having an end wall provided with an annular recess with an inner conical wall inclined to the tubing axis, a sleeve disposed about the said tubing and having a forward inner conical surface and a rear outer conical surface, a protuberance on said outer conical surface, the said flared end of the tubing and the forward portion of the sleeve being proportioned to conjointly enter the said annular recess of the connector member, the recess being proportioned to accommodate said flared end and forward portion from their assembled initial position at the rear entrance of the recess to a final assembled position forwardly thereof, the inclination of the said forward inner conical surface of the sleeve relative to the tubing axis being greater than the inclination of the outer flared surface of the tubing when at said initial position, whereby a substantially conical space is formed between the forward end of the sleeve and the flared end of the tubing, the inclination of the inner conical wall of the said recess relative to the tubing axis being greater than the inclination of the inner flared surface of the tubing at said initial position, whereby a substantially conical space is formed between the flared end of the tubing and the said inner conical wall; further provided with a locking member cooperating with the said connector member and having an internal conical surface inclined to the tubing axis to provide a tapered wall portion, said wall portion being slidably engageable with said rear outer conical surface of the sleeve, the forward edge of said wall portion being engageable with said protuberance, the inclination of said tapered wall portion relative to the tubing axis being greater than the inclination of said rear outer conical surface of the sleeve when the tubing and sleeve are at the said initial position, whereby a substantially conical space is formed between the wall portion and rear end of the sleeve.

2. In a coupling device for tubing having an outwardly flared end portion, a connector member having an end wall provided with an annular recess with an inner conical wall inclined to the tubing axis, a sleeve disposed about the said tubing and having a forward inner conical surface and a rear outer conical surface, the said flared end of the tubing and the forward portion of the sleeve being proportioned to conjointly enter the said annular recess of the connector member, the recess being proportioned to accommodate said flared end and forward portion from their assembled initial position at the rear entrance of the recess to a final assembled position forwardly thereof, the inclination of the said forward inner conical surface of the sleeve relative to the tubing axis being greater than the inclination of the outer flared surface of the tubing when at said initial position, whereby a substantially conical space is formed between the forward end of the sleeve and the flared end of the tubing, the inclination of the inner conical wall of the said recess relative to the tubing axis being greater than the inclination of the inner flared surface of the tubing at said initial position, whereby a substantially conical space is formed between the flared end of the tubing and the said inner conical wall; further provided with a locking member cooperating with the said connector member and having an internal conical surface inclined to the tubing axis to provide a tapered wall portion, said wall portion being slidably engageable with said rear outer conical surface of the sleeve, the inclination of said tapered wall portion relative to the tubing axis being greater than the inclination of said rear outer conical surface of the sleeve when the tubing and sleeve are at the said initial position, whereby a substantially conical space is formed between the wall portion and rear end of the sleeve.

3. In a coupling device for tubing having an outwardly flared end portion, a connector member having an end wall provided with an annular recess with an inner conical wall inclined to the tubing axis, a sleeve disposed about the said tubing and having a forward inner conical surface and a rear outer conical surface, the said flared end of the tubing and the forward portion of the sleeve being proportioned to conjointly enter the said annular recess of the connector member, the recess being proportioned to accommodate said flared end and forward portion from their assembled initial position at the rear entrance of the recess to a final assembled position forwardly thereof, the inclination of the said forward inner conical surface of the sleeve relative to the tubing axis being greater than the inclination of the outer flared surface of the tubing when at said initial position, whereby a substantially conical space is formed between the forward end of the sleeve and the flared end of the tubing, further provided with a locking member cooperating with the said connector member and having an internal conical surface inclined to the tubing axis to provide a tapered wall portion, said wall portion being slidably engageable with said rear outer conical surface of the sleeve.

4. In a coupling device for tubing having an outwardly flared end portion, a connector member having an end wall provided with an annular recess with an inner conical wall inclined to the tubing axis, a sleeve disposed about the said tubing and having a forward inner conical surface and a rear outer conical surface, the said flared end of the tubing and the forward portion of the sleeve being proportioned to conjointly enter the said annular recess of the connector member, the recess being proportioned to accommodate said flared end and forward portion from their assembled initial position at the rear entrance of the recess to a final assembled position forwardly thereof, the inclination of the inner conical wall of the said recess relative to the tubing axis being greater than the inclination of the inner flared surface of the tubing at said initial position, whereby a substantially conical space is formed between the flared end of the tubing and the said inner conical wall; further provided with a locking member cooperating with the said connector member and having an internal conical surface inclined to the tubing axis to provide a tapered wall portion, said wall portion being slidably engageable with said rear outer conical surface of the sleeve.

5. In a coupling device for tubing having an end portion, a connector member having an end wall provided with an annular recess with an inner conical wall inclined to the tubing axis, a sleeve disposed about the said tubing and having a forward inner conical surface and a rear outer conical surface, the said end of the tubing and the forward portion of the sleeve being proportioned to conjointly enter the said annular recess of the connector member, the recess being proportioned to accommodate said end and forward portion from their assembled initial position at the rear entrance of the recess to a final assembled position forwardly thereof, further provided with a locking member cooperating with the said connector member and having an internal conical surface inclined to the tubing axis to provide a tapered wall portion, said wall portion being slidably engageable with said rear outer conical surface of the sleeve, the inclination of said tapered wall portion relative to the tubing axis being greater than the inclination of said rear outer conical surface of the sleeve when the tubing and sleeve are at the said initial position, whereby a substantially conical space is formed between the wall portion and rear end of the sleeve.

6. In a coupling device for tubing having an end portion, a connector member having an end wall provided with an annular recess with an inner conical wall inclined to the tubing axis, a sleeve disposed about the said tubing and having a forward inner conical surface and a rear outer conical surface, a protuberance on said outer conical surface, the said end of the tubing and the forward portion of the sleeve being proportioned to conjointly enter the said annular recess of the connector member, the recess being proportioned to accommodate said end and forward portion from their assembled initial position at the rear entrance of the recess to a final assembled position forwardly thereof, further provided with a locking member cooperative with the said connector member and having an internal conical surface inclined to the tubing axis to provide a tapered wall portion, said wall portion being slidably engageable with said rear outer conical surface of the sleeve, the forward edge of said wall portion being engageable with said protuberance.

7. In a coupling device for pipe, two complementary members in coactive threaded engagement, and a sleeve; one of said members having an annular transverse wall with an annular recess therein presenting a cylindrical outer surface and an opposing inner conical surface inclined to the pipe axis, the sleeve being disposed about said pipe, the forward end of the sleeve being adjacent said annular recess and being internally and conically recessed to provide a forward tapered wall portion, the rear of the sleeve having a conical outer surface inclined to the pipe axis to provide a rear tapered wall portion, the sleeve having intermediate its ends an outer circumferential flange; the other of said two complementary members having an internal conical surface inclined to the said pipe axis and an annular shoulder forwardly thereof, said last-mentioned internal conical surface being engageable with the said rear tapered wall portion of the sleeve, said shoulder being engageable with said flange, whereby upon a rotation of one of said members relative to the other to operatively draw them together, the sleeve will be forced forwardly by the resulting pressure on both its said rear tapered wall portion and its said flange, the forward end of the pipe and the said forward tapered wall of the sleeve being forced, upon said drawing together of said complementary members, to conjointly enter the annular recess, whereby a tight press fit of the tube and sleeve both within the recess and in the region of the said flange will be effected.

FRANK A. KANE, JR.

No references cited.